(12) United States Patent
Mariotti (10) Patent No.: US 9,309,096 B2
(45) Date of Patent: Apr. 12, 2016

(54) INDUSTRIAL TRUCK WITH WHEELARM LEVER SYSTEM

(71) Applicant: OM Carrelli Elevatori S.p.A., Lainate (MI) (IT)

(72) Inventor: Fabio Mariotti, Guastalla (IT)

(73) Assignee: OM Carrelli Elevatori S.p.A., Lainate (MI) (IT)

( * ) Notice: Subject to any disclaimer, the term of this patent is extended or adjusted under 35 U.S.C. 154(b) by 192 days.

(21) Appl. No.: 14/044,042

(22) Filed: Oct. 2, 2013

(65) Prior Publication Data

US 2014/0175351 A1 Jun. 26, 2014

(30) Foreign Application Priority Data

Oct. 15, 2012 (DE) .......................... 10 2012 109 788
Jan. 17, 2013 (DE) .......................... 10 2013 100 464

(51) Int. Cl.
  *B66F 9/12* (2006.01)
  *B66F 9/065* (2006.01)
  *B62B 3/06* (2006.01)

(52) U.S. Cl.
  CPC ................. *B66F 9/12* (2013.01); *B62B 3/0631* (2013.01); *B66F 9/065* (2013.01)

(58) Field of Classification Search
  CPC ......... B66F 9/12; B66F 9/122; B62B 3/0625; B62B 3/0531
  See application file for complete search history.

(56) References Cited

U.S. PATENT DOCUMENTS

| 1,837,600 | A | * | 12/1931 | Warshaw | ........................ 254/9 C |
| 2,050,643 | A | * | 8/1936 | Altieri | ......................... 254/10 C |
| 2,087,861 | A | * | 7/1937 | Quayle | ........................ 254/10 C |
| 2,358,957 | A | * | 9/1944 | Barrett | ........................ 254/10 C |
| 2,598,151 | A | * | 5/1952 | Warshaw | ........................ 254/2 B |
| 8,376,089 | B2 | * | 2/2013 | Stone | ............................ 187/232 |
| 2007/0116548 | A1 | * | 5/2007 | Cooper | ......................... 414/619 |

FOREIGN PATENT DOCUMENTS

| DE | 102004057777 A1 | 6/2006 |
| DE | 102009033709 A1 | 1/2011 |
| EP | 1690823 A2 | 8/2006 |
| FR | 2598142 A1 | 11/1987 |
| GB | 622670 | 5/1949 |
| GB | 2190896 A | 12/1987 |

* cited by examiner

*Primary Examiner* — Lee D Wilson
*Assistant Examiner* — Henry Hong
(74) *Attorney, Agent, or Firm* — The Webb Law Firm (57) ABSTRACT

An industrial truck (1) has a drive section (2) and a load section (4) movable relative to the drive section (2). The load section (4) has at least one wheelarm (5) with at least one load roller (6). A linkage (10) is connected with the load roller (6). A lever system (11) activates the linkage (10). The lever system (11) comprises a first lever (15) swivelably mounted at a first bearing point (16) on the drive section (2) and swivelably mounted at a second bearing point (17) on the load section (4). A second lever (20) swivelably mounted at a bearing point (21) on the load section (4) and coupled at a coupling point (22) with the linkage (10). An intermediate lever (25) is connected at a coupling point (26) with the first lever (15) and at an additional coupling point (27) with the second lever (20).

15 Claims, 6 Drawing Sheets

Fig. 6

INDUSTRIAL TRUCK WITH WHEELARM LEVER SYSTEM

CROSS REFERENCE TO RELATED APPLICATIONS

This application claims priority to German Applications DE 102012109788.7 filed Oct. 15, 2012 and DE 102013100464.4 filed Jan. 17, 2013, which are both herein incorporated by reference in their entirety. This application is related to U.S. application Ser. No. 14/043,972, entitled "Industrial Truck With Load Rollers Located On Load Roller Carriers On A Wheelarm" and published as United States Application Publication No. 2014/0166951, and to U.S. application Ser. No. 14/042,847, entitled "Industrial Truck With Load Rollers Located In Swiveling Load Roller Carriers" and published as United States Application Publication No. 2014/0175350, both filed concurrently herewith and both herein incorporated by reference in their entirety.

BACKGROUND OF THE INVENTION

1. Field of the Invention

This invention relates to an industrial truck, in particular a lift tuck, with a drive section and a load section that can be raised relative to the drive section. The load section has at least one wheelarm which is provided with at least one load roller. A linkage that is in an operative connection with the load roller and a lever system that actuates the linkage are provided to lift the wheelarm.

2. Description of Related Art

Industrial trucks with wheelarms are used to lift pallets by driving the wheelarms under the pallet and then lifting the wheelarms to lift the pallet. For this purpose, the load section is raised or lowered relative to the drive section. Wheelarm levers in which the load rollers are mounted are located so that they can swivel on the wheelarms and are actuated by the lever system and the linkage to lift the wheelarms. On low-lift trucks or order pickers, a lifting movement of this type is called a low lift, while on high-lift trucks with an additional lifting frame, it is called the initial lift.

Lift trucks with load rollers located on the wheelarms, which are actuated by a linkage and a system of levers, are described, for example, in EP 1 690 823 B1 or DE 10 2009 033 709 A1. On these lift trucks, the lever system consists of a reversing lever that is mounted so that it can swivel on the load section. The reversing lever is also mounted or supported on the drive section and is coupled with the linkage. Lever systems of this type, during a lifting or swiveling movement, result in a swiveling movement of the linkage (typically designed as a connecting rod or pusher rod) in which the linkages, depending on the design and construction, extend downwardly beyond the profile of the wheelarms. Lift trucks of the known art are designed for the handling of standardized "euro pallets", which have an entry height for the wheelarms of 100 mm. Therefore, the trucks have a wheelarm height of the wheelarms in the fully lowered position in the range of approximately 85 mm.

On account of the kinematics (i.e., the required movements) of the lever system and of the linkage, a reduction of the wheelarm height to be able to handle special pallets with an entry height which is lower than that of standard euro pallets is not possible on industrial trucks of the known art to prevent the linkage from hitting the ground or roadway or during the raising and lowering of the pallet picked up on the wheelarms.

Therefore, it is an object of this invention to provide an industrial truck of the general type described above but which has improved kinematics of the linkage and makes possible a compact construction of the wheelarms with a low wheelarm height in the lowered position of the load section for handling special pallets with a low entry height.

SUMMARY OF THE INVENTION

The invention teaches that this object is accomplished in that the lever system comprises a first lever movably mounted at a first bearing point on the drive section so that it can swivel and movably mounted at a second bearing point on the load section so that it can swivel; a second lever movably mounted at a bearing point on the load section so that it can swivel and coupled with the linkage by a coupling point; and an intermediate lever connected with a coupling point of the first lever and an additional coupling point of the second lever. On the lever system of the invention, therefore, the linkage is actuated by the second lever which, during the lifting of the load section, is actuated by the first lever by means of the intermediate lever and, therefore, swivels. The lever system of the invention makes possible, during the lifting and lowering of the wheelarms, a horizontal movement of the linkage without undesirable swinging so that the height of the wheelarms can be reduced and the linkage can be prevented from hitting the ground or roadway or hitting the pallets being picked up on the wheelarms during raising and lowering. With the lever system of the invention, it is possible in a simple manner to reduce the height of the wheelarms in the fully lowered position of the load section so that special pallets with an entry height for the wheelarms that is lower than the entry height of standard euro pallets can be handled.

In one advantageous embodiment of the invention, the linkage is in the form of connecting rods. Linkages in the form of connecting rods make possible a compact coupling with the swiveling wheelarm levers in the wheelarms that support the load rollers.

In one advantageous embodiment of the invention, the second bearing point of the first lever and the bearing point of the second lever on the load section are at a spaced distance from each other in the vertical direction. The bearing point of the second lever is located above the second bearing point of the first lever. As a result, favorable kinematics are achieved which make possible a horizontal movement of the linkage and a reduction of the wheelarm height of the wheelarms.

It is particularly advantageous if the first lever is a two-armed lever, the first bearing point is on a first lever arm, and the coupling point for the intermediate lever is on a second lever arm. A two-armed lever of this type can be mounted in a particularly simple manner so that it can swivel between the two lever arms on the load section to actuate the second lever by means of the intermediate lever.

It is particularly advantageous if the second lever is in the form of an angular lever, the coupling point for the linkage is located on a first lever arm, and the coupling point for the intermediate lever is located on a second lever arm. An angular lever of this type can be swivel-mounted in a particularly simple manner on the load section and by means of the first lever arm makes possible a horizontal movement of the linkage.

In one particularly advantageous embodiment of the invention, the second lever is located on the load section such that the bearing point of the second lever on the load section and the coupling point for the intermediate lever are located above the coupling point for the linkage in the vertical direction.

This arrangement achieves favorable kinematics, which makes it possible to reduce the height of the wheelarms.

In one embodiment of the invention, the second lever is located on the load section, such that the additional coupling point of the second lever for the intermediate lever is located above the coupling point of the first lever for the intermediate lever in the vertical direction. As a result of this arrangement, the two levers that are coupled by the intermediate lever can be swiveled in opposite directions, as a result of which the linkage (in the form of connecting rods) can be actuated in a simple manner and a horizontal movement of the linkage during the raising and lowering of the wheelarms is achieved.

In one advantageous embodiment of the invention, when the load section is fully lowered, the intermediate lever is interleaved inside the first lever in the vicinity of the coupling point. That is, the intermediate lever and first lever are horizontally aligned.

The intermediate lever also has a U-shaped cross section with a cutout in which the second lever is nested over the entire lifting range of the load section.

The design of the two levers and of the intermediate lever results in a system of levers that are interleaved in one another (that is, are arranged alternately with each other as if in alternate layers) in the vertical direction with a low height in the vertical direction, which makes possible a low construction height of the wheelarms when the load section is fully lowered.

It is particularly advantageous if the bearing point of the second lever on the load section can be adjusted by adjustment means. On an industrial truck with two wheelarms, the load rollers of which are located in the wheelarms and are each actuated by a lever system and a linkage of the invention, and in which the two lever systems cannot be connected with each other, it is possible, with such adjustment means, to adjust the load rollers on the two wheelarms in a simple manner and, thus, the wheelarms to the same height to achieve a uniform raising and lowering of the two wheelarms and to compensate for tolerances of the individual components.

In one advantageous embodiment of the invention, the bearing point is located on a bearing block that can be adjusted by the adjustment means in the horizontal longitudinal direction of the load section. With a bearing block of this type that can be adjusted in the longitudinal direction of the industrial truck, it is easily possible to adjust the bearing point of the second lever to set the desired position of the load rollers and, thus, the wheelarms.

The bearing block is advantageously guided so that it can be adjusted in slots on a base plate of the load section. This arrangement reduces the manufacturing effort and expense required for the adjustment of the bearing block.

It is particularly advantageous if the adjustment means are formed by an adjustment screw which is in an operative connection with the bearing block and the load section. With an adjustment screw, the bearing block can be adjusted with accuracy and precision to adjust the wheelarms.

In one embodiment of the industrial truck of the invention, the wheelarms in the fully lowered position of the load section have a wheelarm height of less than 50 mm. The compact lever system of the invention, as a result of the kinematics of the linkage in the form of connecting rods, makes it possible to significantly reduce the height of the lowered wheelarms so that the industrial truck of the invention can be driven under and used to lift special pallets, for example pallets made of paper or cardboard, with an entry height that is lower than standard euro pallets.

The invention further relates to a system comprising an industrial truck with a maximum wheelarm height of 50 mm of the wheelarms in the fully lowered position of the load section and a special pallet which has an entry height of 50 mm of the pickup openings for the wheelarms of the industrial truck between the surface of the floor or roadway and an underside of a load-bearing surface of the special pallet. With the industrial truck of the invention, which is provided with a low wheelarm height of the wheelarms in the lowered position, special pallets with a low entry height can be handled safely and without damage.

BRIEF DESCRIPTION OF THE DRAWINGS

Additional advantages and details of the invention are explained in greater detail below with reference to the exemplary embodiment which is illustrated in the accompanying schematic figures, in which like reference numbers identify like parts throughout.

DESCRIPTION OF THE PREFERRED EMBODIMENTS

Figure 1:
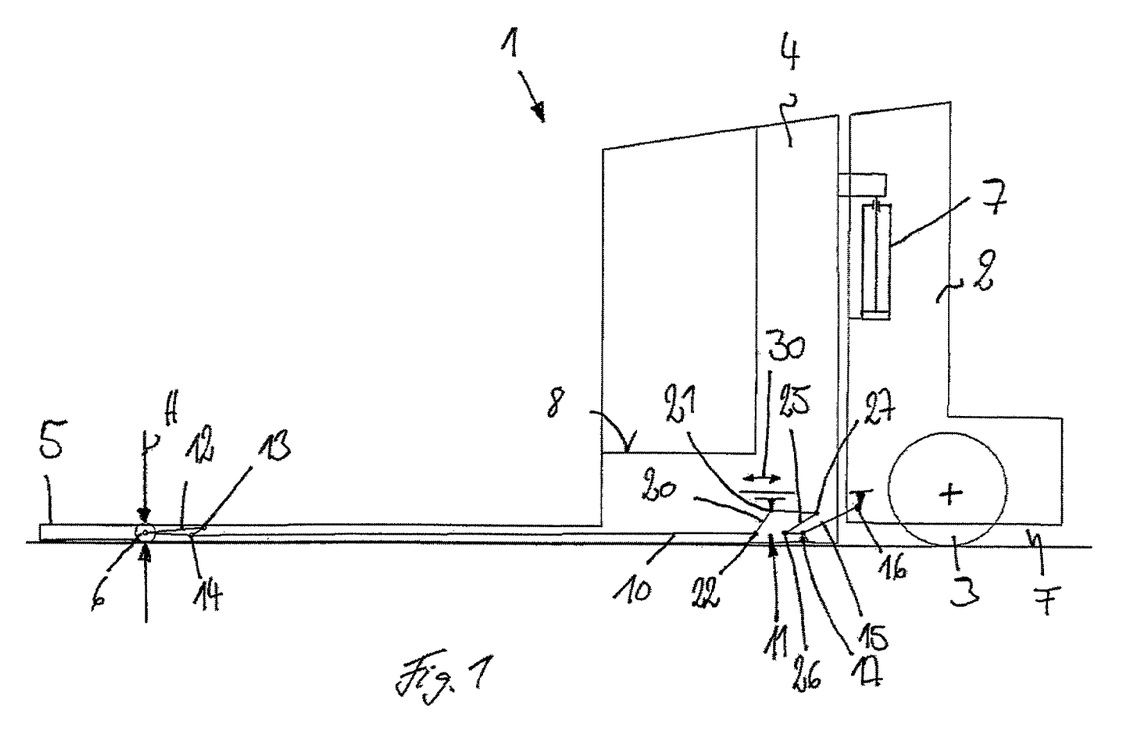
FIG. 1 shows an industrial truck of the invention in a schematic illustration with the load section in the lowered position.
Figure 2:
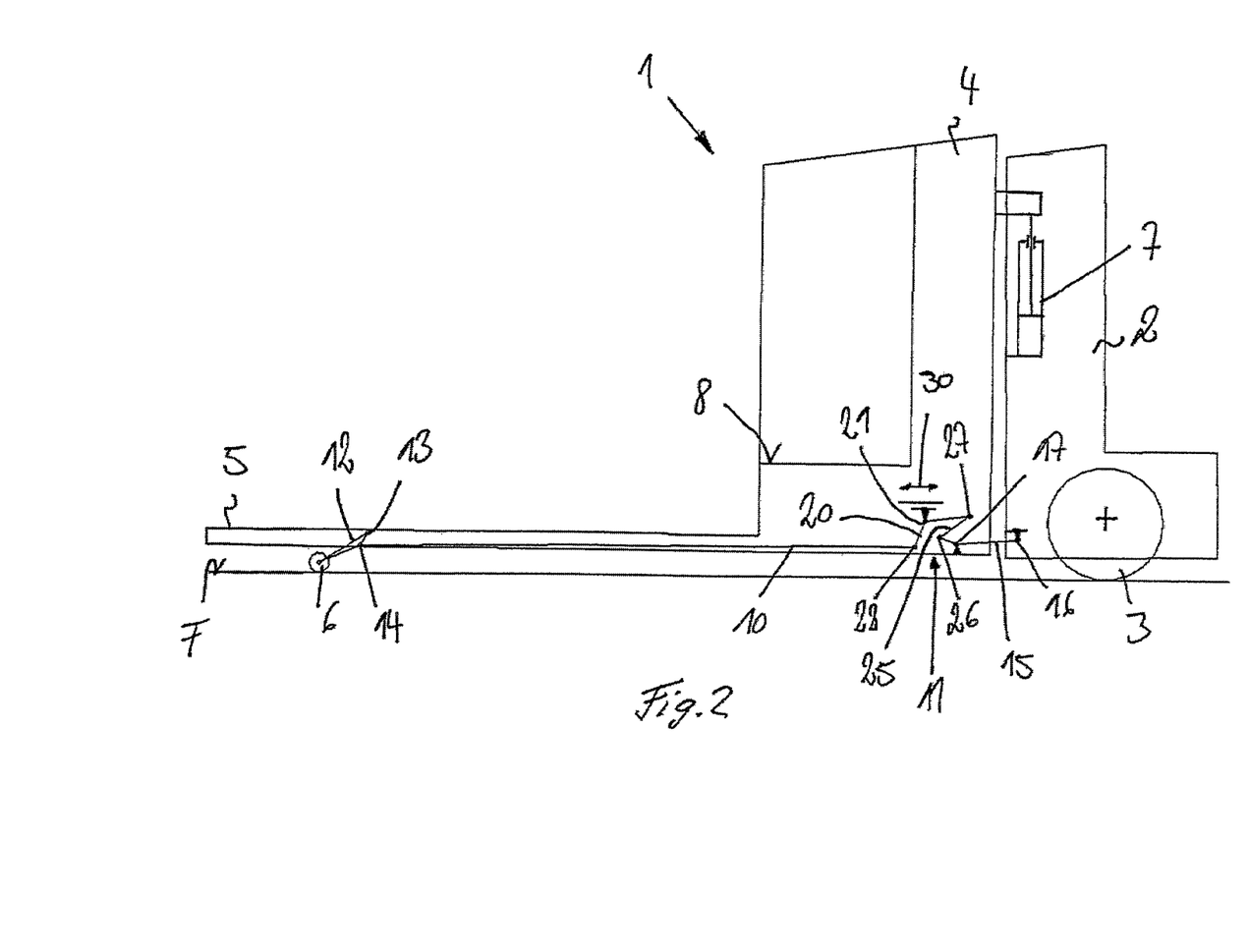
FIG. 2 shows the industrial truck illustrated in FIG. 1 with the load section partly raised.
Figure 3:
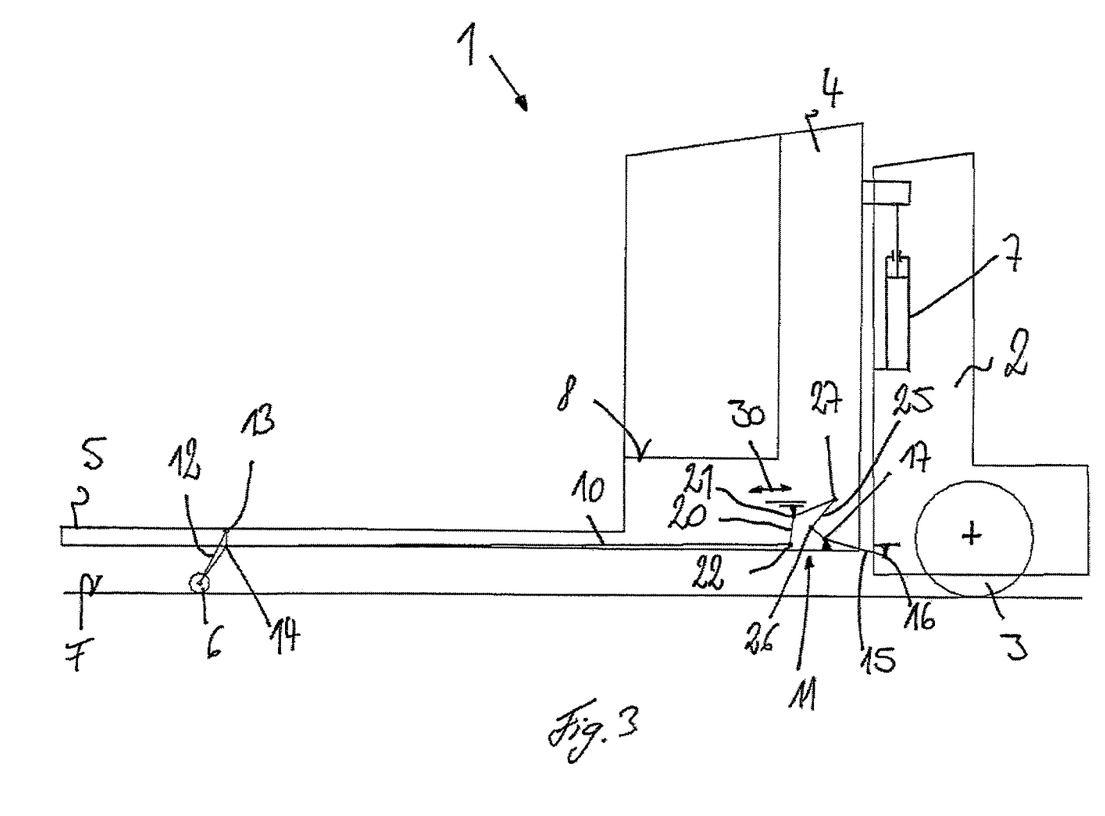
FIG. 3 shows the industrial truck illustrated in FIGS. 1 and 2 with the load section fully raised.

The industrial truck 1 illustrated in side view in FIGS. 1 to 3, such as a lift truck in the form of a low-lift truck or a high-lift truck, for example, has a drive section 2 which is provided with a steerable drive wheel 3, and a load section 4 which can be lifted relative to the drive section 2. The load section 4 preferably comprises two wheelarms 5 which are at a spaced lateral distance from each other and are supported on a roadway F by load rollers 6 located at or near an outer end of each respective wheelarm 5. The drive section 2 is supported on the roadway F by means of the drive wheel 3. To increase stability, the drive section 2 can be supported on the roadway F by means of support rollers, which are not illustrated in any further detail.

To lift the load section 4, a lifting device 7 is provided which includes one or more hydraulic cylinders, for example, and is located between the drive section 2 and the load section 4. To transmit the lifting motion of the load section 4 to the load rollers 6 on the ends of the wheelarms 5, for each wheelarm 5 there is a linkage 10 which is in an operative connection with the load rollers 6 and a lever system 11, which actuates the linkage 10. The lever system 11 can also act as a guide to guide the load section 4 during lifting and lowering movements.

On an industrial truck 1 operated by an electric battery, the load section 4 can also include a battery compartment 8 for a traction battery which supplies electric power to an electrical traction drive of the drive wheel 3 and to an electrical drive system of the lifting device 7.

Figure 4:
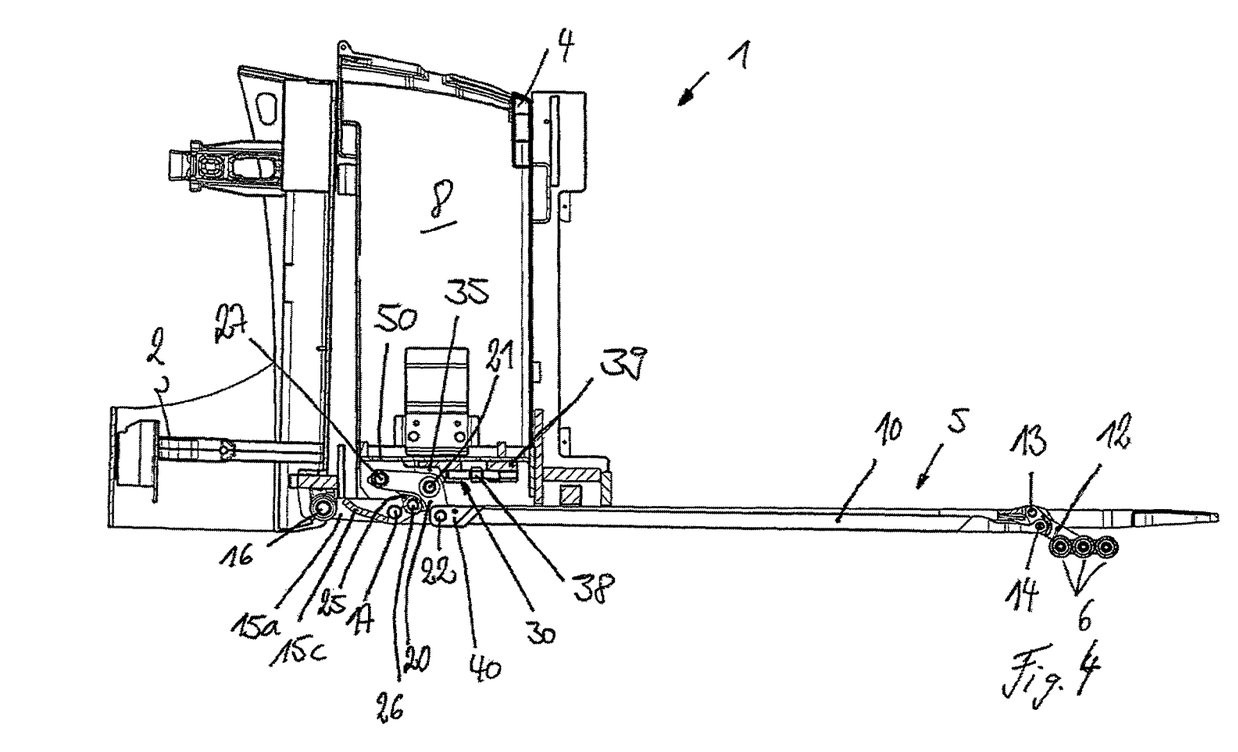
FIG. 4 shows an industrial truck of the invention with a lever system of the invention, in longitudinal section.
Figure 5:
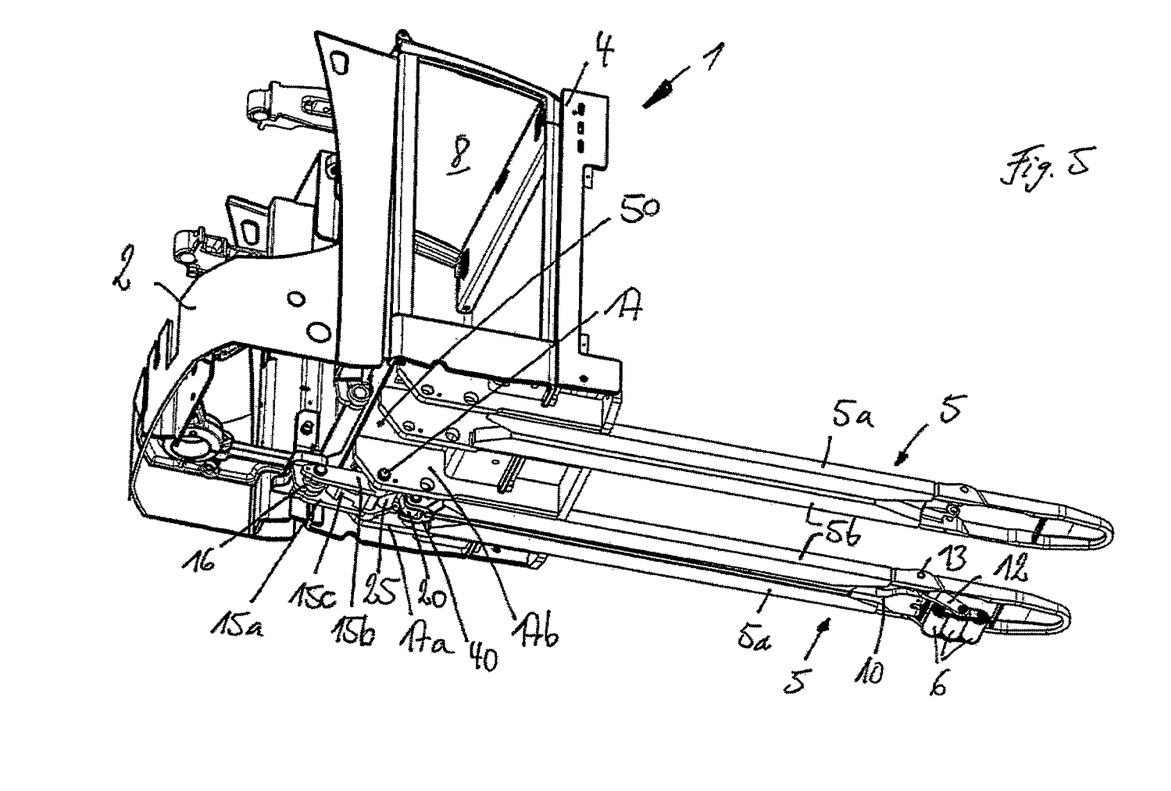
FIG. 5 is a perspective view of the industrial truck illustrated in FIG. 4.
Figure 6:
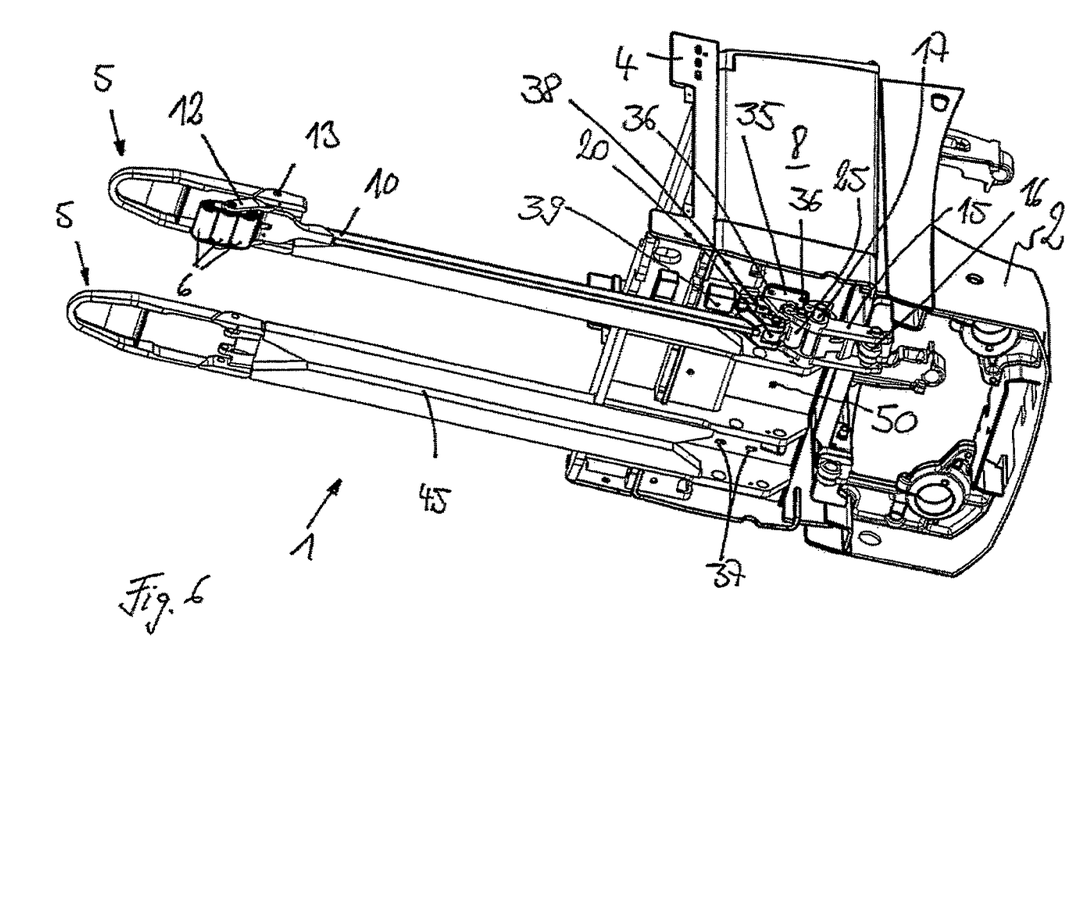
FIG. 6 is an additional perspective view of the industrial truck illustrated in FIGS. 4 and 5.

The load rollers 6 are mounted so that they can rotate in wheelarm levers 12, which are located so that they can swivel on the corresponding wheelarm 5 (FIGS. 4-6). For the swivelmounting of the wheelarm levers 12 on the respective wheelarm 5, there is a swivel bearing 13 on each wheelarm 5. In the illustrated exemplary embodiment the linkages 10 are in the form of connecting rods. The swivel bearing 13 is located in an upper portion of the wheelarm 5 and the linkages 10 are connected in an articulated manner to the wheelarm levers 12 in a vertical direction below the swivel bearing 13 by means of coupling points 14.

To actuate the linkage 10, the lever system 11 of the invention comprises a first lever 15 (rotatably mounted on the drive section 2 by a first bearing point 16 so that it can swivel and also rotatably mounted on the load section 4 by a second bearing point 17 so that it can swivel) and a second lever 20 rotatably mounted on the load section 4 by a bearing point 21 so that it can swivel and is rotatably coupled with the linkage 10 via a coupling point 22. The lever system 11 of the invention also comprises an intermediate lever 25 rotatably connected with a coupling point 26 of the first lever 15 and an additional coupling point 27 of the second lever 20.

The first lever 15 is in the form of a two-armed lever. The second bearing point 17 for the articulated fastening of the first lever 15 to the load section 4 is located in the center region of the first lever 15 and the first bearing point 16 for the articulated fastening of the lever 15 to the drive section 2 is formed on a first lever arm that extends to the drive section 2. The first lever 15 extends beyond the bearing point 17 toward the load section 4 and is provided with a second lever arm which extends vertically slightly upwardly with respect to the first lever arm, on which second lever arm there is a coupling point 26 for the articulated connection of the intermediate lever 25.

The second lever 20 is an angular lever mounted in the center area by the bearing point 21 on the load section 4 so that it can swivel. On a first lever arm of the second lever 20 there is the coupling point 22 for the articulated connection of the linkage 10. On a second lever arm, which extends toward the drive section 2, is the coupling point 27 for the articulated connection of the intermediate lever 25. The second lever arm of the second lever 20, which is in the form of an angular lever, is bent vertically downwardly with respect to the first lever arm of the second lever 20.

In the lever system 11 of the invention, the second bearing point 17 of the first lever 15 and the bearing point 21 of the second lever 20 are located on the load section 4 at a spaced distance from each other in the vertical direction. The bearing point 21 of the second lever 20 is located above the second bearing point 17 of the first lever 15.

In the lever system 11, the second lever 20 is also located on the load section 4 such that the bearing point 21 on the load section 4 and the coupling point 27 for the intermediate lever 25 are located in the vertical direction above the coupling point 22 for the linkage 10.

The second lever 20 is also located on the load section 4 such that the coupling point 27 for the intermediate lever 25 of the second lever 20 is located in the vertical direction above the coupling point 26 for the intermediate lever 25 of the first lever 15.

To achieve a uniform lifting movement of the load rollers 6 in the two wheelarms 5, and to compensate for component tolerances, adjustment means 30 are provided with which the bearing point 21 of the second lever 20 can be adjusted in the horizontal longitudinal direction of the load section 4.

In the lever system 11, during the lifting of the load section 4 (as illustrated in FIGS. 1 to 3) the first lever 15, which is connected to the bearing point 16 on the drive section 2, swivels in the clockwise direction around the second bearing point 17 on the load section 4. By means of the intermediate lever 25, the second lever 20 swivels in the counterclockwise direction around the bearing point 21 on the load section 4. With the lever system 11, a purely horizontal movement of the linkage 10 in the form of connecting rods is achieved, in which the linkage 10 remains within the height of the wheelarms 5.

The lever system 11 with the achievable horizontal movement of the linkage 10 in the form of connecting rods makes it possible to reduce the height of the wheelarms 5 so that the wheelarms 5 in the fully lowered position of the load section 4 have a wheelarm height H of less than 50 mm, so that the industrial truck 1 can handle special pallets which have an entry height for the wheelarms 5 of as low as of 50 mm.

FIGS. 4 to 6 show a constructive embodiment of the industrial truck 1 illustrated in FIGS. 1 to 3.

FIGS. 4 to 6 show the industrial truck 1 with a fully raised load section 4.

In this exemplary embodiment, the bearing point 16 of the first lever 15 on the drive section 2 is formed by a bearing eye in which the first lever 15 is mounted by a bearing pin.

The first lever 15 is formed by two side plates 15a, 15b, which are separated from each other in the transverse direction of the vehicle, and a reinforcing plate 15c. The bearing point 17 of the first lever 15 on the load section 4 is formed by two side plates 17a, 17b, which are separated from each other in the transverse direction of the vehicle, between which the first lever 15 is mounted so that it can swivel by means of a bearing pin. The side plates 17a, 17b are located on the underside of a base plate 50 of the battery compartment 8.

The intermediate lever 25 is a bracket clip with a U-shaped cross section which is articulatedly fastened to the first lever 15 and the second lever 20 by means of bearing pins, forming the coupling points 26, 27. The intermediate lever 25 is located between the side plates 15a, 15b of the first lever 15. The bracket-shaped intermediate lever 25 is formed by two side plates that are separated from each other in the transverse direction of the vehicle and a tubular connecting piece that connects the side plates. The tubular connecting piece is located between the side plates 15a, 15b of the first lever 15 and holds the bearing pin that forms the coupling point 26 for the articulated connection of the intermediate lever 25 to the first lever 15, and for this purpose is held in the side plates 15a, 15b of the first lever 15.

The second lever 20 is a bracket that resembles an angular lever. The second lever arm that extends toward the drive section 2 and on which the coupling point 27 formed by the bearing pin is located, is located centrally between the two side plates of the intermediate lever 25 and the U-shaped cutout formed by the side plates of the intermediate lever 25. The bearing pin that forms the coupling point 27 is held in the two side plates of the intermediate lever 25 and the lever 20.

During a lifting movement of the load section 4, the first and second levers 15, 20 and the intermediate lever 25 are interleaved in one another in the vertical direction over the entire lifting range, so that a low height of the wheelarms 5 when the load section 4 is fully lowered is achieved. In the fully lowered position of the load section 4, the intermediate lever 25 with the coupling point 27 is interleaved to the maximum possible extent in the vicinity of the reinforcement plate 15c into the first lever 15. The second lever 20 is interleaved over the full lifting range of the load section 4 in the cut out formed by the two side plates of the intermediate lever 25. During the lifting, the intermediate lever 25 extends with the coupling point 27 from the first lever 15, and the second lever 20, which is located between the side plates of the intermediate lever 25, is retracted further into the U-shaped cutout of the intermediate lever 25 formed by the two side plates of the intermediate lever 25. Consequently, a lower height of the first and second levers 15, 20 and of the intermediate lever 25 and, thus, a lower height of the wheelarms 5 is achieved in the fully lowered position of the load section 4 and makes it possible, during the lifting of the load section 4, for the first and second levers 15, 25 to swivel in opposite directions.

The bearing point 21 of the second lever 20 on the load section 4 is on a bearing block 35, on which the second lever 20 is mounted so that it can swivel by means of a bearing pin. The bearing block 35 is fastened to the underside of the base plate 50 of the battery compartment by a plurality of threaded fasteners 36 located in slots 37 of the base plate 50. The slots 37 extend in the longitudinal direction of the vehicle, so that the bearing block 35, and thus the bearing point 21 of the second lever 20, can be adjusted in the longitudinal direction of the vehicle.

To adjust the bearing point 21, adjustment means 30 in the form of an adjustment screw 38 are provided which are connected to the bearing block 35 and an abutment means 39 fastened to the base plate 50.

The linkage 10 in the form of connecting rods, for articulated connection with the second lever 20, is provided with a bearing fork 40 mounted so that it can swivel by means of a bearing pin on the coupling point 22 of the second lever 20.

In the vicinity of the wheelarm lever 12, the corresponding connecting rod is connected in an articulated manner by a bearing pin at the coupling point 14 with the wheelarm lever 12.

Each wheelarm 5 has two longitudinal carriers 5a, 5b separated laterally from each other, between which a channel 45 is formed to hold the linkage 10.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. An industrial truck, comprising:
    a drive section;
    a load section movable relative to the drive section wherein the load section comprises at least one wheelarm and wherein the wheelarm includes at least one load roller;
    a linkage in an operative connection with the load roller to lift the wheelarm; and
    a lever system operatively connected to the linkage,
    wherein the lever system comprises a first lever swivelably mounted at a first bearing point on the drive section and swivelably mounted at a second bearing point on the load section, a second lever swivelably mounted at a bearing point on the load section and coupled at a coupling point with the linkage, and an intermediate lever connected with a coupling point of the first lever, separate from the first bearing point and the second bearing point, and an additional coupling point of the second lever.

2. The industrial truck of claim 1, wherein the linkage comprises connecting rods.

3. The industrial truck of claim 1, wherein the second bearing point of the first lever and the bearing point of the second lever are located on the load section with a spaced vertical separation, such that the bearing point of the second lever is located above the second bearing point of the first lever.

4. The industrial truck of claim 1, wherein the first lever is a two-armed lever, and wherein the first bearing point is on a first lever arm and the coupling point for the intermediate lever is on a second lever arm.

5. The industrial truck of claim 1, wherein the second lever is an angular lever, and wherein the coupling point for the linkage is on a first lever arm and the coupling point for the intermediate lever is on a second lever arm.

6. The industrial truck of claim 1, wherein the second lever is located on the load section such that the bearing point of the second lever on the load section and the coupling point for the intermediate lever are located in the vertical direction above the coupling point for the linkage.

7. The industrial truck of claim 1, wherein the second lever is located on the load section such that the additional coupling point of the second lever for the intermediate lever is located in the vertical direction above the coupling point of the first lever with the intermediate lever.

8. The industrial truck of claim 1, wherein, when the load section is in a fully lowered position, the intermediate lever in the vicinity of the coupling point is interleaved into the first lever.

9. The industrial truck of claim 1, wherein the intermediate lever has a U-shaped cross section with a cutout in which the second lever is interleaved over an entire lifting range of the load section.

10. The industrial truck of claim 1, wherein the bearing point of the second lever on the load section is adjustable by an adjustment arrangement.

11. The industrial truck of claim 10, wherein the bearing point of the second lever is on a bearing block which is adjustable by the adjustment arrangement in a horizontal longitudinal direction of the load section.

12. The industrial truck of claim 11, wherein the bearing block is adjustably guided in slots on a base plate of the load section.

13. The industrial truck of claim 11, wherein the adjustment arrangement comprises an adjustment screw operatively connected with the bearing block and the load section.

14. The industrial truck of claim 1, wherein the wheelarms in fully lowered position of the load section have a wheelarm height of less than 50 mm.

15. A system, comprising:
    an industrial truck, comprising:
        a drive section;
        a load section movable relative to the drive section, wherein the load section comprises at least one wheelarm and wherein the wheelarm includes at least one load roller;
        a linkage in an operative connection with the load roller to lift the wheelarm; and
        a lever system operatively connected to the linkage,
        wherein the lever system comprises a first lever swivelably mounted at a first bearing point on the drive section and swivelably mounted at a second bearing point on the load section, a second lever swivelably mounted at a bearing point on the load section and coupled at a coupling point with the linkage, and an intermediate lever connected with a coupling point of the first lever, separate from the first bearing point and the second bearing point, and an additional coupling point of the second lever, wherein the industrial truck has a maximum wheelarm height in a fully lowered position of the load section of 50 mm; and
    a pallet having a maximum entry height for wheelarms of an industrial truck of 50 mm.

* * * * *

UNITED STATES PATENT AND TRADEMARK OFFICE
CERTIFICATE OF CORRECTION

PATENT NO. : 9,309,096 B2
APPLICATION NO. : 14/044042
DATED : April 12, 2016
INVENTOR(S) : Fabio Mariotti Page 1 of 1

It is certified that error appears in the above-identified patent and that said Letters Patent is hereby corrected as shown below:

In the claims,
Column 8, Line 41, Claim 14, before "fully" insert -- a --

Signed and Sealed this
Fifth Day of July, 2016

Michelle K. Lee
*Director of the United States Patent and Trademark Office*